United States Patent [19]

Newman

[11] 3,849,239

[45] Nov. 19, 1974

[54] PRESSURE-SENSITIVE TRANSFER ELEMENTS

[75] Inventor: Wilfred Harry Newman, Holland-on-Sea, England

[73] Assignee: Ozalid Company Limited, Loughton, Essex, England

[22] Filed: June 15, 1973

[21] Appl. No.: 370,527

[30] Foreign Application Priority Data
June 23, 1972 Great Britain.................... 29539/72
Sept. 29, 1972 Great Britain.................... 45135/72

[52] U.S. Cl.................. 161/160, 161/190, 161/256
[51] Int. Cl....... B32b 3/26, B32b 5/18, B32b 27/30
[58] Field of Search..................... 161/160, 190, 256

[56] References Cited
UNITED STATES PATENTS

| | | | |
|---|---|---|---|
| 3,497,416 | 2/1970 | Critchfield et al.................. | 161/256 |
| 3,575,793 | 4/1971 | Paisley............................... | 161/256 |
| 3,661,677 | 5/1972 | Wang.................................. | 161/256 |
| 3,682,764 | 8/1972 | Findlay et al....................... | 161/160 |

Primary Examiner—William J. Van Balen
Attorney, Agent, or Firm—Cushman, Darby & Cushman

[57] ABSTRACT

A pressure-sensitive transfer element consisting of a backing film of pretreated polypropylene, a layer of a cured polyurethane composition containing from 15 to 35 percent by weight based on the solids content of a compatible polymer consisting of a vinyl polymer or a cellulose ester, an intermediate layer of polyvinylidene chloride or of uncured polyurethane resin on said layer and a layer of microporous polymer sponge on said intermediate layer.

7 Claims, No Drawings

PRESSURE-SENSITIVE TRANSFER ELEMENTS

This invention relates to pressure-sensitive transfer elements, suitable for use as carbon papers or typewriter ribbons, of the type comprising a substrate carrying a layer of microporous polymer sponge, the pores of which are filled with a pigmented oily ink. As is well known, the impact of a typewriter key on such material expels ink from the pores in the impacted area, the layer of sponge remaining intact on the substrate and the pores becoming recharged with ink in the impacted area on removal of the pressure exerted by the key.

Polypropylene film is a desirable material to use as a substrate in such material but has a very poor adhesion to coatings applied to it, notwithstanding the fact that it is normally subjected by the manufacturers to pretreatment by corona discharge or flame in an attempt to mitigate this difficulty. I have attempted to secure bonding of the sponge layer to a pretreated polypropylene film by the interposition between the film and the sponge layer of a layer of polyurethane resin.

I found that, upon curing, the layer of polyurethane formed a firm bond with the polypropylene but that a coating of dissolved sponge material would not adhere to it. The coating peeled off when the material was wrinkled. I then realized:

a. that this was due to the fact that there was no constituent in the cured polyurethane which could be attacked by the solvent for the sponge material to form a solvent bond at the interface, and b. that the coating of sponge material could not be effectively applied before curing of the polyurethane was completed because the solvent for the sponge material would attack it to such an extent as to destroy the bond to the polypropylene.

I next investigated the effect of mixing the polyurethane with a compatible polymer, i.e., a polymer soluble in the same solvent, which would be the subject of attack by the solvent for the sponge material. The compatible polymers which can be successfully used are vinyl polymers and cellulose esters. I found that, provided the amount of compatible polymer amounted to 15 – 35 percent by weight of the mixture of polyurethane and compatible polymer, what appeared to be a satisfactory interface was obtained at both interfaces of the modified polyurethane layer. The material was nevertheless impracticable as a commercial product because, upon impact of a typewriter key, the polyurethane layer tended to flake off from the polypropylene backing and the material was useless after use in a typewriter for a few minutes.

Ultimately I achieved success by interposing a layer of polyvinylidene chloride (PVDC) between the modified polyurethane layer and the sponge layer. While PVDC will not bond to a layer of pure polyurethane it bonds satisfactorily to a layer of the modified polyurethane and for some unexplained reason the intervening layer of PVDC between the sponge layer and the layer of polyurethane prevents rupture in the typewriter between the polyurethane and the polypropylene. I have also achieved success using a layer of uncured polyurethane resin in place of a layer of PVDC as the intermediate layer.

The invention accordingly provides a pressure-sensitive transfer element consisting of a backing film of pretreated polypropylene, a layer of a cured polyurethane composition containing from 15 to 35 percent by weight based on the solids content of a compatible polymer consisting of a vinyl polymer or a cellulose ester, an intermediate layer of polyvinylidene chloride or of uncured polyurethane resin on said layer and a layer of microporous polymer sponge on said intermediate layer.

Preferably the compatible polymer, which is soluble in the intermediate layer, is nitrocellulose, but other suitable compatible polymers are vinyl chloride/vinyl acetate copolymers, cellulose acetate, cellulose propionate and mixtures of these cellulose esters. The preferred amount of compatible polymer is 25 percent by weight of the mixture of polyurethane and compatible polymer.

The following are examples of pressure-sensitive transfer elements according to the invention:

EXAMPLE I

1. Base film. Polypropylene, pretreated by corona discharge, of thickness 0.0008 inch.

2. Polyurethane layer of the following batch composition:

| | | |
|---|---|---|
| Daltosec 1450 (50% by weight solution of uncured polyurethane in ethyl acetate) | 7.2 | kilograms |
| Nitrocellulose I.C.I.PGML 15/25 | 1.2 | do. |
| Ethyl acetate | 3 | gallons |

Coating weight 1 to 2 gms/sq.metre.
Thickness of dried film 0.000016 – 0.000032 inch.

3. PVDC layer of the following batch composition:

| | | |
|---|---|---|
| PVDC | 18 | gms |
| methyl ethyl ketone | 72 | do. |

Coating weight 2 to 3 gms/sq.metre.
Thickness of dried film 0.000032 – 0.000048 inch.

4. Sponge (ink transfer) layer of the following batch composition:

| | | |
|---|---|---|
| Toluene | 44 | kilograms |
| VYHD (vinyl chloride/acetate copolymer) | 11.6 | do. |
| Acetone | 29 | do. |
| Paste (colouring matter and oil) | 24 | do. |
| Shale (ink retaining pigment powder) | 5 | do. |

Coating weight 25 gms/sq.metre.
Thickness of dried layer 0.0001 inch.

EXAMPLE II

A base film of polypropylene, pretreated by corona discharge and of thickness 0.0008 inch was coated with a polyurethane layer of the following batch composition:

| | |
|---|---|
| Daltosec 1450 (50% by weight solution of uncured polyurethane in ethyl acetate) | 7.2 kilograms |
| Nitrocellulose I.C.I. PGML/15/25 | 1.2 kilograms |
| Ethyl acetate | 3 gallons |

Coating weight 1 to 2 gms/sq.metre.

After drying, this yielded on the base film a film of cured polyurethane of thickness 0.000016–0.000032 inch.

Upon this dried film of cured polyurethane was applied a coating of uncured polyurethane resin of the following composition:

| | | |
|---|---|---|
| Witco Bond BC6 (25% by weight solution of uncured polyurethane in methyl ethyl ketone (obtainable from Witco Chemicals, Droitwich) | 53.25 | kilograms |
| Cellulose Acetate Butyrate 171/2 | 4.14 | do. |
| Methyl Ethyl Ketone | 46.61 | do. |

Coating weight of 2 gms/sq.metre.

Finally, to this coating in which the polyurethane remains uncured in the final product, was applied a sponge (ink transfer) layer of the following composition:

| | | |
|---|---|---|
| Toluene | 44 | kilograms |
| VYHD (vinyl chloride/acetate copolymer) | 11.6 | do. |
| Acetone | 29 | do. |
| Paste (colouring matter and oil) | 24 | do. |
| Shale (ink retaining pigment powder) | 5 | do. |
| Coating weight 25 gms/sq.metre. | | |
| Thickness of dried layer | | 0.001 inch. |

EXAMPLE III

The layer of polyurethane containing a compatible polymer in either of Examples I and II is replaced by a layer of the following composition:

| | |
|---|---|
| Daltosec 1450 (50% by weight solution of uncured polyurethane in ethyl acetate). | 7.2 Kg. |
| Ethyl acetate | 3 gallons. |
| Vinyl chloride/vinyl acetate copolymer VYHH (obtainable from Bakelite Xylonite Limited) 87% chloride/13% acetate | 1.2 Kg. |

EXAMPLE IV

The vinyl chloride/vinyl acetate copolymer VYHH of Example III is replaced by the same amount of copolymer VYLF from the same suppliers, which has the same percentage composition of vinyl chloride and vinyl acetate but a different molecular weight.

EXAMPLE V

The vinyl chloride/vinyl acetate copolymer in the layer of polyurethane of Example III is replaced by any of the following compatible polymers in the following amounts:

| | | |
|---|---|---|
| (i) Cellulose acetate | 0.7 | Kg. |
| (ii) Cellulose propionate | 1.53 | do. |
| (iii) Cellulose butyrate | 1.0 | do. |
| (iv) Nitrocellulose | 0.6 | Kg. and |
| Cellulose acetate | 0.6 | Kg. |

What I claim as my invention and desire to secure by Letters Patent is:

1. A pressure-sensitive transfer element consisting of a backing film of pretreated polypropylene, a layer of a cured polyurethane composition containing from 15 to 35 percent by weight based on the solids content of a compatible polymer consisting of a vinyl polymer or a cellulose ester, an intermediate layer of polyvinylidene chloride or of uncured polyurethane resin on said layer and a layer of microporous polymer sponge on said intermediate layer.

2. A transfer element as claimed in claim 1, in which the layer of cured polyurethane composition contains the compatible polymer in the amount of 25 percent by weight of the mixture of polyurethane and compatible polymer.

3. A transfer element as claimed in claim 1, in which the compatible polymer is nitrocellulose.

4. A transfer element as claimed in claim 1, in which the compatible polymer is a vinyl acetate copolymer.

5. A transfer element as claimed in claim 1, in which the compatible polymer is cellulose acetate.

6. A transfer element as claimed in claim 1, in which the compatible polymer is cellulose propionate.

7. A transfer element as claimed in claim 1, in which the compatible polymer is cellulose butyrate.

* * * * *